UNITED STATES PATENT OFFICE 2,295,574

SUBSTITUTED [1,3,5 - TRIAZINYL - (6)] - AMINOPHENYL-ARSONIC ACIDS AND PROCESS FOR MANUFACTURE OF SAME

Ernst Albert Hermann Friedheim, Geneva, Switzerland

No Drawing. Application December 20, 1939, Serial No. 310,232. In Switzerland December 23, 1938

15 Claims. (Cl. 260—242)

Condensation products of triazines with various amines are known and used in the manufacture of dyes. However, derivatives of triazines containing arsenic have hitherto not been prepared.

It has now been found that highly active therapeutic derivatives of [1,3,5-triazinyl-(6)]-aminophenyl-arsonic acids can be obtained by reacting 1,3,5-triazine derivatives with phenyl-arsonic acid derivatives. This reaction may be effected with halogen derivatives of triazine. The resulting reaction products can, if necessary, be treated further by known methods with ammonia or alkyl-amines. Amino- and amino-halogen-derivatives of 1,3,5-triazine are also suitable for carrying out the present invention. The reaction of 2,4,6-triamino-1,3,5-triazine with halogeno-phenyl-arsonic acids also gives rise to the products claimed in this invention.

The new compounds, which are to be employed as medicinal preparations, have proved to exert an extraordinarily strong action in experimental trypanosomiasis in the mouse. The dose necessary for a lasting cure is up to ten times smaller than in the case of the medicinal preparations derived from phenyl-arsonic acids hitherto used. The toxicity is low, that is, the therapeutic margin is considerable, which is particularly important in view of the danger of poisoning attending the use of remedies containing arsenic.

The new compounds are 1,3,5-triazine derivatives of the formula

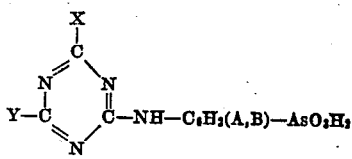

wherein X and Y are each a radical selected from the group consisting of halogen, —NH$_2$, —NH Alk., —N Alk.$_2$, hydroxy-alkyl-amino, —NHCH$_2$CHOHCH$_2$OH, and dialkyl-amino-alkyl-amino radicals, and A and B are selected from the group consisting of hydrogen, halogen, —OH, —O Alk., —NO$_2$, —NH$_2$, —NH Alk., —N Alk.$_2$ and alkyl radicals.

These compounds may be prepared by reacting a triazine derivative of the formula

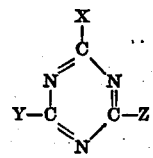

with a substituted phenyl-arsonic acid of the formula:

one of W and Z being a halogen radical and the other an amino radical. If desired, the reaction product may be treated with ammonia, alkyl amines, dialkyl amines, hydroxy-alkyl amines and dialkyl-amino-alkyl amines to react with any remaining triazine halogen atoms.

A few examples illustrating the working of the present invention are given below, but the invention is not limited to these specific cases.

Example 1

A solution of 31 parts by weight of sodium-p-amino-phenyl-arsonate in 155 parts by weight of water is added dropwise to a fine suspension of 18.5 parts by weight of cyanuric chloride (2,4,6-trichloro-1,3,5-triazine) in 500 parts by weight of water in the course of 1 hour while cooling and stirring vigorously. After this time the primary aromatic amine has disappeared. The white reaction product which forms a suspension is filtered off, washed with water and then with acetone.

The resulting p-[2,4-dichloro-1,3,5-triazinyl-(6)]-aminophenyl-arsonic acid of the formula

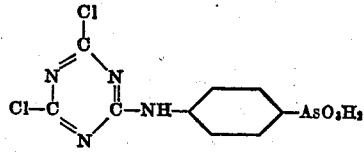

is a white powder insoluble in cold water, which can be dissolved in aqueous alkalis without colouration. The compound is insoluble in alcohol, ether, benzene. The solution in concentrated sulphuric acid is colourless.

Example 2

The moist p-[2,4-dichloro-1,3,5-triazinyl-(6)]-aminophenyl-arsonic acid obtained in accordance with Example 1 is covered with 10 times the quantity of 10% ammonia and shaken at 45° C. for 1 hour, whereby the product goes into complete solution. The excess ammonia is removed under reduced pressure. On acidification with hydrochloric acid p-[2-chloro-4-amino-1,3,5-triazinyl-(6)]-aminophenyl-arsonic acid of the formula

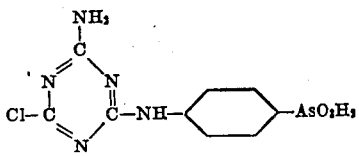

is isolated in the form of small white crystals which are filtered off and washed with water and acetone.

The resulting compound is soluble in alkalis and also on warming with an excess of dilute mineral acid. It is insoluble in water, alcohol, ether and benzene. On heating to higher temperatures, the compound decomposes without having a definite melting point.

Example 3

The moist p-[2,4-dichloro-1,3,5-triazinyl-(6)]-aminophenyl-arsonic acid prepared in accordance with Example 1 is heated in an autoclave under pressure to 110–130° C. for about 2 hours with 10 times the quantity of 25% ammonia. When excess ammonia has been driven off, the product is treated with excess hydrochloric acid, whereupon the hydrochloride of p-[2,4-diamino-1,3,5-triazinyl-(6)]-aminophenyl-arsonic acid of the formula

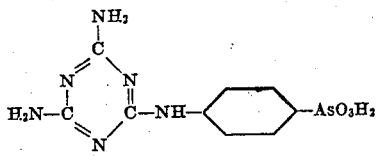

separates in small white crystals. It is sucked off and washed with cold water. The compound is soluble in aqueous alkalis and separates in voluminous white flakes on the addition of acetic acid. The picrate forms bunches of fine small needles, the chloro-platinate forms small yellow crystals.

Instead of working in an autoclave, the reaction of p-[2,4-dichloro-1,3,5-triazinyl-(6)]-aminophenyl-arsonic acid with ammonia can also take place in an open vessel also yielding p-[2,4-diamino-1,3,5-triazinyl-(6)]-aminophenyl-arsonic acid.

Example 4

36.5 parts by weight of chloro-cyanuric-diamide ("Liebig's Annalen," vol. 10, year 1834, page 43) are boiled for about 2 hours under reflux with a solution of 31 parts by weight of atoxyl in 300 parts by weight of water whereupon the atoxyl disappears. The white reaction product is brought into solution by the addition of ammonia. The sulphate of p-[2,4-diamino-1,3,5-triazinyl-(6)]-aminophenyl-arsonic acid is precipitated from the filtered solution by sulphuric acid. The arsonic acid corresponds in all its properties with the compound obtained in accordance with Example 3.

The same compounds can be prepared if triamino-triazine (melamine)

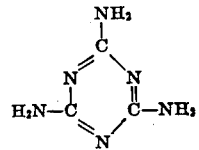

is reacted with halogeno-phenyl-arsonic acid (German patent specifications 205,449, 250,264. Mameli, Patta "Chemisches Zentralblatt" year 1909, I, page 1091; year 1909, II, page 1856.)

Example 5

10 parts by weight of a 17% solution of methylamine are poured over 1 part by weight of p-[2,4-dichloro-1,3,5-triazinyl-(6)]-aminophenyl-arsonic acid obtained in accordance with Example 1 whereby solution sets in with evolution of heat. The solution is boiled until the excess of methylamine is driven off. Sufficient hydrochloric acid is then added to render the product just acid to congo paper upon which the hydrochloride of p-[2,4 dimethylamino-1,3,5-triazinyl-(6)]-aminophenyl-arsonic acid of the formula

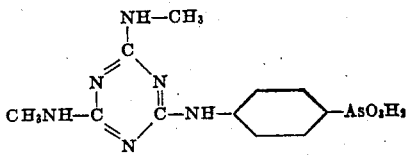

precipitates in small, white, crystalline needles on cooling. These needles are filtered off and washed with cold water. The compound is soluble in alkalis and dilute mineral acids without colouration; it is insoluble in ether and benzene.

Instead of p-amino-phenyl-arsonic acid, its derivatives or isomers, such as, for instance, 4-oxy-3-amino-(1)-phenyl-arsonic acid-(1) or 2-oxy-4-amino-phenyl-arsonic acid may be employed in all the examples given above.

I claim:

1. A 1,3,5-triazine derivative of the formula

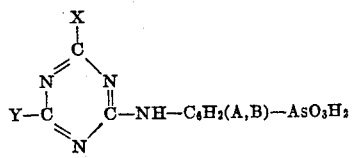

wherein X and Y are each a radical selected from the group consisting of halogen, —NH₂, —NH lower Alk., —N Alk.₂, hydroxy-alkyl-amino, —NHCH₂CHOHCH₂OH, dialkyl-amino-alkylamino radicals, and A and B are selected from the group consisting of hydrogen, halogen, —OH, —O Alk., —NO₂, —NH₂, —NH Alk., —N Alk.₂ and alkyl radicals.

2. p-[2,4-diamino-1,3,5-triazinyl-(6)]-aminophenyl-arsonic acid of the formula

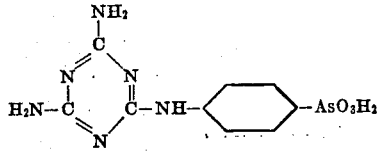

3. m-[2,4-diamino-1,3,5-triazinyl-(6)]-amino-p-hydroxyphenyl-arsonic acid of the formula

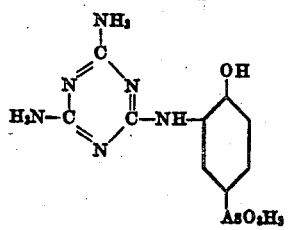

4. In a process for the preparation of a 1,3,5-triazine derivative of the formula

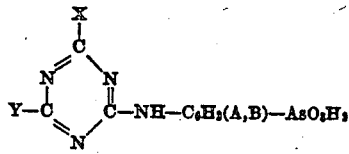

wherein X and Y are each a radical selected from the group consisting of halogen, —NH₂, —NH lower Alk., —N Alk.₂, hydroxy-alkyl-amino, —NHCH₂CHOHCH₂OH, dialkyl-amino-alkyl-amino radicals, and A and B are selected from the group consisting of hydrogen, halogen, —OH, —O Alk., —NO₂, —NH₂, —NH Alk., —N Alk.₂ and alkyl radicals, the step comprising reacting a triazine derivative of the formula

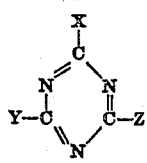

with a substituted phenyl-arsonic acid of the formula

wherein one of Z and W is a halogen radical and the other is an amino radical.

5. A process for the preparation of a 1,3,5-triazine derivative of the formula

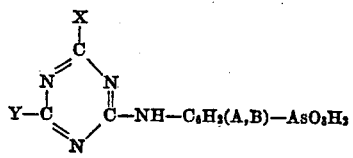

wherein X and Y are each a radical selected from the group consisting of halogen, —NH₂, —NH lower Alk., —N Alk.₂, hydroxy-alkyl-amino, —NHCH₂CHOHCH₂OH, and dialkyl-amino-alkyl-amino radicals, and A and B are selected from the group consisting of hydrogen, halogen, —OH, —O Alk., —NO₂, —NH₂, —NH Alk., —N Alk.₂ and alkyl radicals, comprising reacting a triazine derivative of the formula

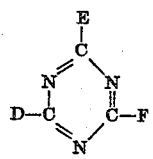

with a substituted phenyl-arsonic acid of the formula

wherein one of F and W is a halogen radical and the other is an amino radical, and wherein one of D and E is a halogen radical and the other a radical selected from the group consisting of halogen, —NH₂, —NH lower Alk., —N Alk.₂, hydroxy-alkyl-amino, —NHCH₂CHOHCH₂OH, and dialkyl-amino-alkyl-amino radicals, and treating the reaction product with a base selected from the group consisting of ammonia, alkyl amines, dialkyl amines, hydroxy-alkyl amines and dialkyl-amino-alkyl amines.

6. Process for the preparation of 2,4-diamino-1,3,5-triazine derivatives of the formula

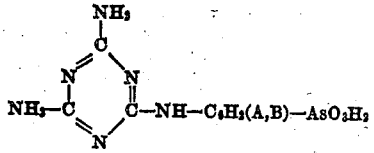

comprising reacting cyanuric chloride of the formula

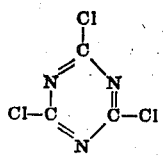

with aminophenyl-arsonic acids of the formula

where A and B are selected from the group consisting of H, halogen, OH, O Alk., NO₂, NH₂, NH Alk., N Alk.₂ and alkyl, and subjecting the product to the action of ammonia.

7. Process for the preparation of 2,4-diamino-1,3,5-triazine derivatives of the formula

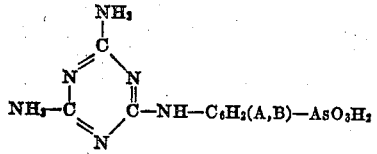

comprising reacting 2-chloro-4,6-diamino-1,3,5-triazine of the formula

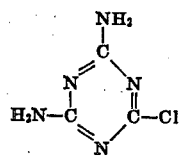

with aminophenyl-arsonic acids of the formula

where A and B are selected from the group consisting of H, halogen, OH, O Alk., NO₂, NH₂, NH Alk., N Alk.₂ and alkyl.

8. Process for the preparation of p-[2,4-dichloro-1,3,5-triazinyl-(6)]-aminophenyl-arsonic acid of the formula

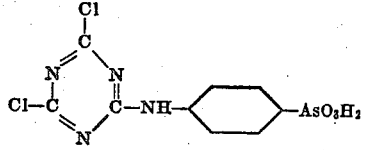

comprising reacting cyanuric chloride with p-aminophenyl-arsonic acid.

9. Process for the preparation of p-[2,4-diamino-1,3,5-triazinyl-(6)]-aminophenyl-arsonic acid of the formula

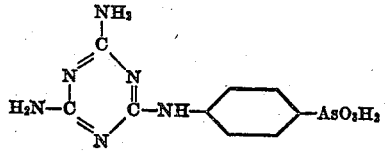

comprising reacting cyanuric chloride with p-aminophenyl-arsonic acid and subsequent treatment of the p-[2,4-dichloro-1,3,5-triazinyl-(6)]-aminophenyl-arsonic acid with ammonia.

10. Process for the preparation of p-[2,4-diamino-1,3,5-triazinyl-(6)]-aminophenyl - arsonic acid of the formula

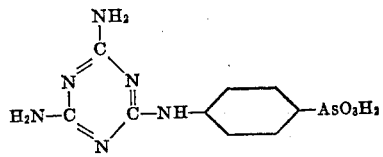

comprising reacting cyanuric chloride with p-aminophenyl-arsonic acid in aqueous suspension and subsequent treatment of the p-[2,4-dichloro-1,3,5-triazinyl-(6)]-aminophenyl-arsonic acid with concentrated ammonia in aqueous solution.

11. Process for the preparation of p-[2,4-diamino-1,3,5-triazinyl-(6)]-aminophenyl - arsonic acid of the formula

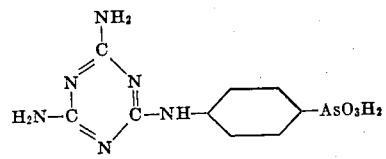

comprising reacting cyanuric chloride with p-aminophenyl-arsonic acid in aqueous suspension and subsequent treatment of the p-[2,4-dichloro-1,3,5-triazinyl-(6)]-aminophenyl-arsonic acid with ammonia in aqueous solution under pressure.

12. Process for the preparation of p-[2,4-diamino-1,3,5-triazinyl-(6)]-aminophenyl - arsonic acid of the formula

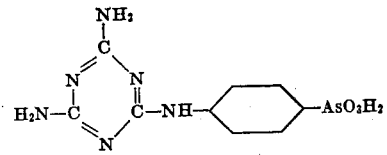

comprising reacting chloro-cyanuric diamide with p-aminophenyl-arsonic acid.

13. Process for the preparation of m-[2,4-diamino-1,3,5-triazinyl - (6)] - amino -p- hydroxy-phenyl-arsonic acid of the formula

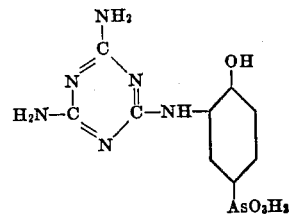

comprising reacting cyanuric chloride with 4-hydroxy-3-aminophenyl-arsonic acid and subsequent treatment of the m-[2,4-dichloro-1,3,5-triazinyl -(6)]- amino -p- hydroxy - phenyl-arsonic acid so formed, with ammonia.

14. A process for the preparation of 1,3,5-triazine derivatives of the formula

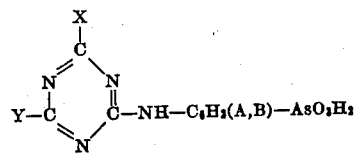

wherein X and Y are each a radical selected from the group consisting of halogen, $-NH_2$, $-NH$ lower Alk., $-N$ Alk.$_2$, hydroxy-alkyl-amino, $-NHCH_2CHOHCH_2OH$, dialkyl - amino - alkyl-amino radicals, and A and B are selected from the group consisting of hydrogen, halogen, $-OH$, $-O$ Alk., $-NO_2$, $-NH_2$, $-NH$ Alk., $-N$ Alk.$_2$ and alkyl radicals, comprising reacting a triazine derivative of the formula

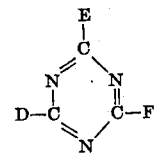

wherein at least two of the radicals D, E and F are halogen radicals and the other is a radical selected from the group consisting of halogen, $-NH_2$, $-NH$ lower Alk., $-N$ Alk.$_2$, hydroxy-alkyl-amino, $-NHCH_2CHOHCH_2OH$ and dialkyl-amino-alkyl-amino radicals, with a substituted amino-phenyl-arsonic acid of the formula $$NH_2—C_6H_2(A,B)—AsO_3H_2$$

wherein A and B are each selected from the group consisting of hydrogen, halogen, $-OH$, $-O$ Alk., $-NO_2$, $-NH_2$, $-NH$ Alk., $-N$ Alk.$_2$ and alkyl radicals, and treating the reaction product with a base selected from the group consisting of ammonia, alkyl amines, dialkyl amines, hydroxy-alkyl amines and dialkyl-amino-alkyl amines.

15. A process for the preparation of 1,3,5-triazine derivatives of the formula

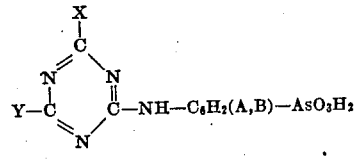

wherein X and Y are each a radical selected from the group consisting of halogen, $-NH_2$, $-NH$ lower Alk., $-N$ Alk.$_2$, hydroxy-alkyl-amino, $-NHCH_2CHOHCH_2OH$, dialkyl - amino - alkyl-amino radicals, and A and B are selected from the group consisting of hydrogen, halogen, $-OH$, $-O$ Alk., $-NO_2$, $-NH_2$, $-NH$ Alk., $-N$ Alk.$_2$ and alkyl radicals, comprising reacting a cyanuric halide of the formula

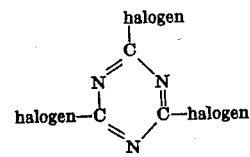

with an aminophenyl-arsonic acid of the formula $$H_2N—C_6H_2(A,B)—AsO_3H_2$$

and reacting the resulting substituted p-[2,4-dihalogeno-1,3,5-triazinyl-(6)] with a base selected from the group consisting of ammonia, alkyl amines, dialkyl amines, hydroxy-alkyl amines and dialkyl-amino-alkyl amines.

ERNST ALBERT HERMANN FRIEDHEIM.